Patented Aug. 23, 1932

1,873,564

UNITED STATES PATENT OFFICE

DAVID ALEXANDER WHYTE FAIRWEATHER AND ROBERT FRASER THOMSON, OF STIRLING, SCOTLAND, ASSIGNORS TO IMPERIAL CHEMICAL INDUSTRIES LIMITED, A CORPORATION OF GREAT BRITAIN

PRODUCTION OF 2-AMINOANTHRAHYDROQUINONE 9:10-DISULPHURIC ESTER AND ITS SALTS

No Drawing. Application filed December 24, 1931, Serial No 583,148, and in Great Britain December 31, 1930.

This invention relates to the production of 2-aminoanthrahydroquinone 9:10-disulphuric ester and its salts.

In U. S. application Serial No. 318,997 there has been described a process for the production of amino-anthrahydroquinone-9:10-disulphuric acid ester salts, which comprises the treatment of acyl-amino-anthraquinones with pyridine sulphur trioxide in the presence of a metal and a tertiary organic base, the resulting ester being hydrolyzed to remove the acyl group and if desired, the resulting product being converted into a sodium or like salt. The examples in this specification include the production of ester salts of 2-amino-anthrahydroquinone in which the treatment of 2-acylamino-anthraquinone with pyridine sulphur trioxide in the presence of a metal and a tertiary organic base is carried out at a temperature of 90° C. for about one hour after the addition of the metal powder.

We have now discovered an improved or modified process which consists in carrying out the treatment of the 2-acylamino-anthraquinone with pyridine sulphur trioxide in the presence of a metal and a tertiary organic base at a temperature of about 80° C. and for a period of about 3 hours.

We have found that when the 2-acylamino-anthraquinone is, for example, 2-acetylamino-anthraquinone the yield is substantially increased and is almost theoretical. Similarly, improved yields are obtained when other acyl derivatives are employed, e. g. the propionyl, butyryl, benzoyl, phenylacetyl and other acyl derivatives.

The invention is illustrated by the following example, in which the parts are by weight.

Example 50 parts of pyridine sulphuric anhydride are mixed with 100 parts of dry pyridine and heated to 80° C. until solution is complete and 20 parts of 2-acetylamino-anthraquinone in a finely divided condition are then added. The mixture is maintained at 80° C. while 16 parts of copper or bronze powder are introduced over a period of half an hour, the mixture being then stirred at 80° C. for a further 3 hours. The melt is then cooled to 30° C., run into a solution made from 250 parts of water and 34 parts of sodium carbonate, and the mixture steam distilled and filtered. 7.5 parts of caustic soda are then added and the whole boiled for half an hour.

Various other salts can be made in known manner from the sodium salt thus prepared or from the free ester.

As many apparently widely different embodiments of this invention may be made without departing from the spirit and scope thereof, it is to be understood that we do not limit ourselves to the specific embodiments thereof except as defined by the appended claims.

We claim:

1. Process for the manufacture of 2-acylaminoanthrahydroquinone 9:10-disulphuric esters and their salts comprising the treatment of a 2-acylaminoanthraquinone with pyridine-sulphur trioxide in presence of a metal of the class consisting of copper and bronze and a tertiary organic base, said organic base being a heterocyclic compound at about 80° C. for a period of about 3 hours.

2. Process as claimed in claim 1 followed by the removal of the acyl group by hydrolysis.

3. Process as claimed in claim 1 in which the acyl group is an acetyl group.

4. Process for the manufacture of 2-aminoanthrahydroquinone 9:10-disulphuric ester comprising the treatment of 2-acetylaminoanthraquinone with pyridine-sulphuric anhydride, copper powder and pyridine at about 80° for about 3 hours, cooling the melt, adding excess of an aqueous solution of sodium carbonate, removing pyridine by steam-distillation, removing copper and copper compounds from the aqueous residue by filtration, adding caustic soda and finally boiling to remove the acetyl group by hydrolysis.

5. Process as claimed in claim 4 with the substitution of bronze powder for copper powder.

In testimony whereof we affix our signatures.

DAVID A. W. FAIRWEATHER.
ROBERT FRASER THOMSON.